April 26, 1966   C. T. BANNON, JR., ETAL   3,247,745
WIRE CUTTER

Filed Jan. 17, 1964                              2 Sheets-Sheet 1

INVENTORS
Carl T. Bannon, Jr.
Roswell W. Harding
BY
Ezekiel Wolf, Wolf & Greenfield
ATTORNEYS April 26, 1966   C. T. BANNON, JR., ETAL   3,247,745
WIRE CUTTER
Filed Jan. 17, 1964   2 Sheets-Sheet 2

INVENTORS
Carl T. Bannon, Jr.
BY Roswell W. Harding

Ezekiel Wolf, Wolf & Greenfield
ATTORNEYS

3,247,745
WIRE CUTTER
Carl T. Bannon, Jr., Plaistow, N.H., and Roswell W. Harding, Winchester, Mass., assignors to Ross Engineering Corporation, Haverhill, Mass., a corporation of Massachusetts
Filed Jan. 17, 1964, Ser. No. 338,502
9 Claims. (Cl. 83—323)

This invention relates to wire cutters and more particularly comprises a new and improved device for rapidly cutting wire into precise lengths.

At the present time wire cutters used to cut long lengths of wire into shorter pieces of precise length ordinarily employ reciprocal or oscillatory motion which necessarily limits the speed in which wire may be cut, impresses relatively large stresses on the machine during operation and requires large and relatively expensive equipment.

One important object of this invention is to provide a wire cutter capable of cutting wire into short lengths of very precise dimensions.

Another important object of this invention is to provide a wire cutter capable of very rapidly cutting wire into short lengths.

Another important object of this invention is to provide a wire cutter which is wholly automatic, relatively inexpensive to manufacture, subject to minimum wear and operates quietly and accurately with minimum maintenance.

Yet another important object of this invention is to provide a wire cutter which does not employ oscillatory motion.

To accomplish these and other objects the wire cutter of this invention is organized about a chain which travels its course about a pair of sprockets and which chain carries on selected links cutters which grip the wire so as to carry the wire with the chain until each link passes a particular station. As each cutter passes through a particular station it is automatically actuated to sever the wire. The distance between the cutters determines the length of the pieces cut.

These and other objects and features of this invention, along with its incident advantages, will be better understood and appreciated from the following detailed description of one embodiment thereof selected for purposes of illustration and shown in the accompanying drawing, in which.

Figure 1:
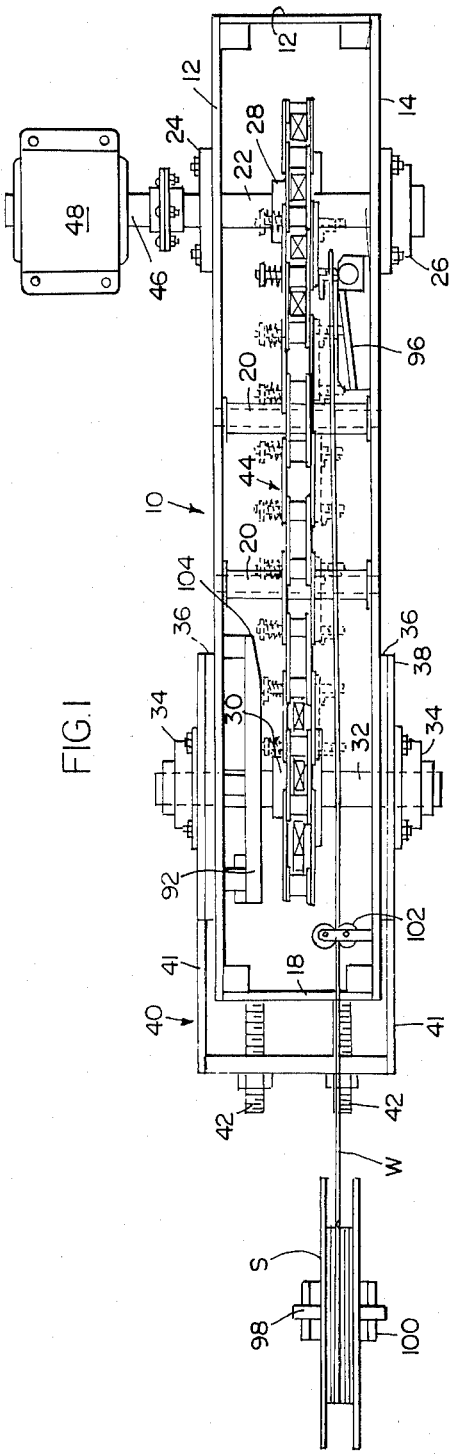
FIG. 1 is a top view of a wire cutter constructed in accordance with this invention.

The wire cutter shown in the drawing is organized about a frame 10 having a pair of side panels 12 and 14 secured together by end walls 16 and 18 and spacers 20. A drive shaft 22 extends across the frame adjacent one end between the side panels 12 and 14 and is supported in bearing assemblies 24 and 26. The drive shaft 22 carries a drive sprocket 28, and a second sprocket 30 is carried on idler shaft 32 which extends between the panels 12 and 14 adjacent the other end of the frame. The idler shaft 32 is supported in a pair of bearings 34 which in turn are carried by plates 36 as is evident in FIGS. 1 and 2. The plates 36 are movable horizontally in channels 38 along the outer faces of the panels 12 and 14 to vary the distance between the drive shaft 22 and the idler shaft 32. An adjusting yoke 40 extends about the end wall 18 of the frame and its arms 41 are secured to the plates 36. A pair of adjusting screws 42 secured to the yoke serve to move the yoke and the plates 36 back and forth in the channels 38 on the panels. The two adjusting screws 42 enable the operator not only to move the shaft 32 toward and away from the drive shaft 22 but further permit the operator precisely to align the shaft 32 parallel to the drive shaft.

A double link chain 44 is carried on the sprockets 28 and 30 and is driven about the course defined by the sprockets by the drive shaft 22 which in turn is coupled to the shaft 46 of the motor 48. A gear reduction box may be connected intermediate the motor shaft 46 and the drive shaft 22 to achieve the desired speed. Moreover, motor 48 may be of variable speed so as to enable the operator to control the speed at which the machine operates.

Figure 3:
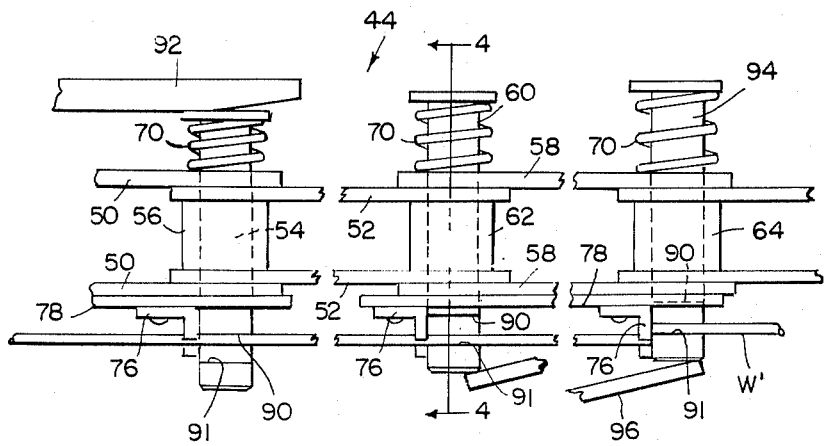
FIG. 3 is an enlarged detail view of a portion of the cutter shown in FIGS. 1 and 2.

In FIG. 3 several of the double links of chain 44 are shown, and the manner in which they are connected is described below in detail. Two links 50 are shown connected to the next pair of links 52 by a pin 54 which extends through openings in the adjacent ends of the links and through a spacer sleeve 56. Similarly, the pair of links 52 are connected to the next pair of links 58 by pin 60 which also extends through a spacer sleeve 62. The sleeves 56 and 62 are identical in length and in turn are identical to the additional spacer sleeves 64 about the full length of the endless chain 44.

Figure 4:
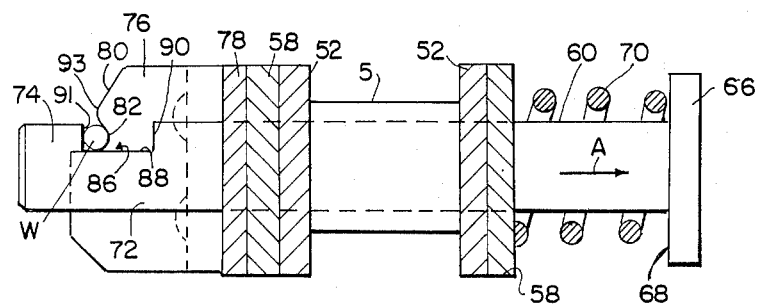
FIG. 4 is a cross-sectional view taken along the section line 4—4 in FIG. 3.

Each of the pins including the pin 60 shown in FIG. 4 is provided with a head 66 which retains between its inner face 68 and the outer face of the link 58 a coil spring 70. The spring acts in compression to urge the pin in the direction of arrow A. The other end 72 of the pin 60 as well as each of the other pins which make up the connections between the links of the chain carries a movable cutting blade 74 which cooperates with a fixed blade 76 anchored to the adjacent link on the same side of the chain. In FIGS. 3 and 4 plates 78 are shown secured to the outer faces of one each of links 50 and 58 and in turn support the fixed blades 76 riveted or otherwise secured in place.

The outer edge of each fixed blade is shown in FIG. 4 to be provided with a lead in angle or bevel 80 and a cutting notch 82 beneath the bevel for purposes which will become clear below. In FIG. 4, the wire W is shown seated against the cutting notch 82 and is held in place by the movable blade 74. The movable blade 74 is defined by a slot or seat 86 having a flat base 88, an inner side wall 90 and a cutting or shearing edge 91. The flat bottom 88 actually supports the wire W and cooperates with the cutting notch 82 of the fixed blade 76 and the edge 91 to grip the wire W when the chain moves. The margin 93 of the notch 82 also retains the wire in place.

The pin 60 which carries the movable blade 74 is shown in FIG. 4 disposed in its biased position wherein the shearing edge 91 actually urges the wire against the cutting notch 82 of the fixed blade. To sever the wire it is necessary to move the pin 60 in the direction of the arrow A to cause the shearing face 91 to pass to the right as viewed in FIG. 4 beyond the notch 82. In order to position the wire W in the cutting notch 82 it is necessary to move the pin 60 to the left as viewed in FIG. 4 in a direction opposite to arrow A so as to expose more of the seat 88 beyond the fixed blade.

In FIG. 3, the three pins shown are disposed in the three different positions assumed by the pins when they travel the course with the chain about the sprockets 22 and 32. The pin 54 is shown moved downwardly as viewed in FIG. 3 by the action of opening cam 92 acting upon the head of the pin against the bias of the coil spring 70. In that position the shearing edge 91 of the movable blade 74 is separated from the cutting notch 82 of the fixed blade so that a substantial portion of the flat bottom wall 88 of the recess 86 is exposed. In that position the wire may be placed in the seat defined by the fixed and movable blades, and the bevel 80 will assist in directing the wire W into place. The pin 60 of FIG. 3 is shown positioned beyond the cam 92 so that the spring 70 urges the shearing edge 91 of the movable blade against the wire to hold it firmly in the cutting notch 82 and prevents the wire from lifting off the flat bottom wall 88. The third pin 94 shown in FIG. 3 is engaged by the cutting cam 96 which pushes the pin further upwardly as viewed in that figure to cause the shearing edge 91 to pass inwardly beyond the cutting notch 82 of the fixed blade. Accordingly, a segment W' of the wire in FIG. 3 is shown severed from the remaining portion of the wire. It is evident that when the chain carries pin 94 to the right beyond the end of cutting cam 96, the pin will be released to the action of the spring 70 which will maintain the pin in the position shown until it is again opened by the opening cam 92.

Figure 2:
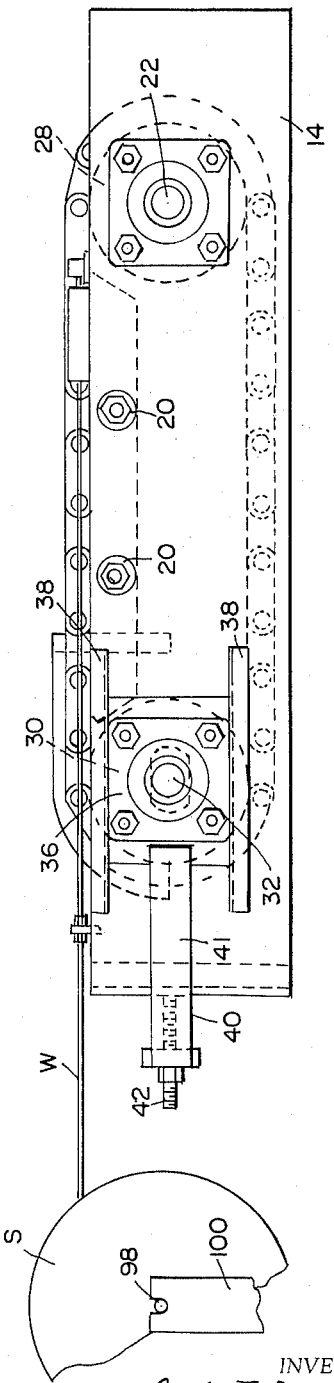
FIG. 2 is a side view of the cutter shown in FIG. 1.

Having described the different parts of the mechanism illustrated, the operation of the mechanism should be apparent to the reader and consequently it will be described only briefly. In FIGS. 1 and 2 a spool S of wire W is shown carried on a shaft 98 in turn resting upon the pillars 100. The wire W on the spool S is fed between a pair of guide rollers 102 mounted on the inner side of panel 14, and the wire extends from the guide rollers 102 to the cutters partly defined by the pins joining each adjacent pair of links. To start the mechanism the operator places the leading portion of the wire W within the cutters which are open by virtue of their engagement by the opening cam 92. The operator may then move the chain manually in a clockwise direction as viewed in FIG. 2 and pull the wire W with it so that one or two of the cutters in which the wire is disposed are released by the opening cam 92 so that the wire is firmly engaged by those cutters. The machine is then ready for fully automatic operation. The operator then need only turn on the motor 48 to drive the chain automatically. It will be evident that as the chain is driven by the motor the wire is picked up by each cutter as the cutters pass beyond the cam 92, and the wire is pulled along the upper run of the chain, and as each of the cutters reaches the cutting cam 96 its pin rides up the inclined cam face as is evident in FIG. 1 until the wire is actually severed. Each and every pin will be engaged by the cam 96 so the wire is cut into short lengths exactly equal to the distance between the pins. As the pins are uniformly spaced by the links, each piece of wire cut is exactly equal in length to the pieces cut before and after it. While the short lengths of wire are being continuously cut at the leading edge, the wire just beyond the guide rolls 102 is automatically threaded into the cutters with the aid of the lead bevel 80 as they turn about the sprocket 30 and are individually opened by the action of the opening cam 92. As indicated the wire is firmly held by the cutters as they travel between the trailing edge 104 of the opening cam 92 and the cutting cam 96.

From the foregoing description it will be apparent that as the motor 48 continuously drives the chain 44 the wire will be continuously cut into small segments until the spool S is exhausted. The absence of reciprocal motion of any of the major parts of the device reduces vibration and shock to a minimum, maintains the noise at a relatively low level, and allows the various parts of the device to be of a reasonable size. The chain itself precisely establishes the length of the individual pieces of wire cut by the device, and to vary the length of the cut it is necessary to use a different chain having links of different lengths. For this purpose the chain and sprockets may be readily changed in the device.

From a reading of the foregoing description numerous modifications may occur to those possessing ordinary skill in the art. Therefore, it is not intended that the breadth of this invention be limited to the single embodiment illustrated and described. Rather, it is intended that the scope of this invention be determined by the appended claims and their equivalents.

What is claimed is:

1. A wire cutter comprising
a link chain and a sprocket for driving the chain,
means including said sprocket defining the course traveled by the chain,
cutters disposed at the connections between selected links of the chain,
means for opening the cutters at a location along the course,
means biasing the cutters to a closed position and operable when the cutters are disposed in other than at said location,
and means disposed at another location along the course for causing each cutter passing through the other location to cut wire disposed in it.

2. A wire cutter comprising
a link chain and a sprocket for driving the chain,
means including said sprocket defining the course traveled by the chain,
cutters disposed at the connections between selected links of the chain,
means for opening the cutters as they pass a particular location in the course enabling the wire to be cut to be placed in the cutters,
means operatively connected to the cutters urging the cutters to a closed position wherein they grip the wire disposed in them and carry the wire along the course,
and means disposed at another location along the course for actuating the cutters to cut the wire disposed in them.

3. A wire cutter as defined in claim 2 further characterized by,
each of said cutters comprising a fixed and a movable blade,
said movable blade being carried by a pin connecting adjacent links of the chain.

4. A wire cutter comprising,
a double link endless chain with adjacent pairs of links being connected by axially movable pins,
means including a sprocket for driving the chain through a prescribed course,
a fixed blade carried by the chain adjacent each pin,
a movable blade carried by each pin and extending beyond each fixed blade with a cutting edge facing the cutting edge of the fixed blade,
means engaging the pins and biasing the cutting edges of the movable blades toward the cutting edges of the fixed blades,
means for driving the sprocket to move the chain through the course,
an opening cam extending along a portion of the course and in the path of the pins and moving each pin to a position against the biasing means to separate the cutting edges of the fixed and movable blades,
and a cutting cam disposed along another portion of the course and in the path of the pins causing the cutting edges of the movable blades to move beyond the cutting edges of the fixed blades and sever wire disposed in them.

5. In a wire cutter,
a double link chain and a sprocket for driving the chain through a course,
a pin connecting adjacent links of the chain and carrying one blade of a cutting device,
a second blade of the cutting device carried on the chain adjacent the pin,
and means disposed adjacent the course and in the path of the cutting device for actuating the blades to cause them to cut as the cutting device passes said means.

6. In a wire cutter as defined in claim 5,
means forming part of the cutting device biasing the blades toward one another enabling the cutting device to carry with it wire to be cut as the chain moves.

7. In a wire cutter as defined in claim 6,
additional means disposed adjacent the course for moving the blades apart against the biasing means,
and guide means forming part of the wire cutter for causing the wire to be cut to enter between the blades of the cutting device as the chain moves through the course.

8. A wire cutter comprising
a chain and a sprocket carrying the chain and defining a course through which the chain moves,
a plurality of cutting devices mounted on the chain and which travel with it about the course,
means forming part of each cutting device biasing the cutting devices to a condition wherein they grip wire disposed in them,
means disposed adjacent the course for opening each cutting device as each travels through a prescribed portion of the course and enabling wire to be cut to be deposited in the cutting devices,
and additional means disposed adjacent the course beyond the last recited means for sequentially actuating the cutting devices as they each pass the additional means to cut wire disposed in them.

9. A wire cutter as defined in claim 8 further characterized, by
each of the cutting devices including a fixed and a movable blade carried by the chain,
a cutting notch provided in one of the blades for receiving wire for cutting,
and means defined in part by the margin of the notch for retaining the wire when gripped by the device.

References Cited by the Examiner

UNITED STATES PATENTS

| Re. 15,566 | 3/1923 | Wulff | 83—326 |
| 2,053,260 | 9/1936 | Blashill | 83—325 |
| 2,791,274 | 5/1957 | Rivers | 83—323 |

WILLIAM W. DYER, Jr., *Primary Examiner.*